A. S. GEAR.
Machine for Working Stone.
No. 125,949. Patented April 23, 1872.
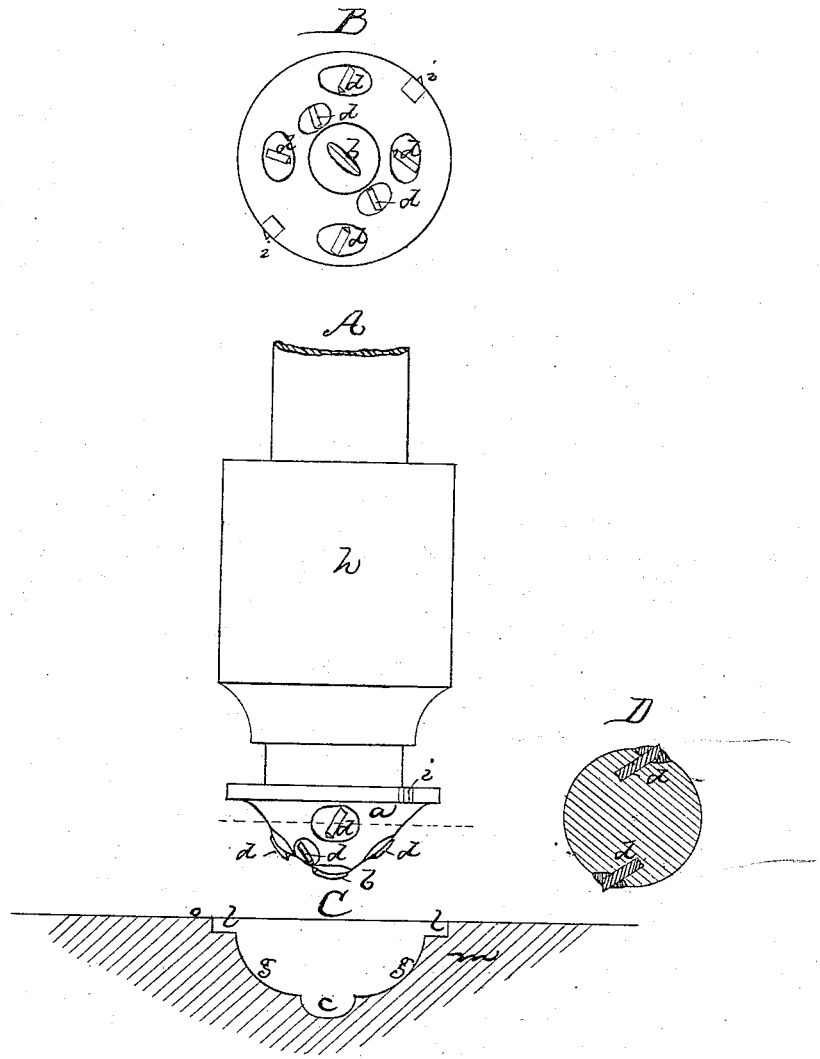
Witnesses,
M. W. Frothingham.
L. H. Latimer.
Alonzo S. Gear,
By his Attys.
Crosby & Gould

UNITED STATES PATENT OFFICE.

ALONZO S. GEAR, OF BOSTON, MASSACHUSETTS.

IMPROVEMENT IN MACHINES FOR WORKING STONE.

Specification forming part of Letters Patent No. 125,949, dated April 23, 1872.

*To all whom it may concern:*

Be it known that I, ALONZO S. GEAR, of Boston, in the county of Suffolk and State of Massachusetts, have invented an Improvement in Working Stone; and I do hereby declare that the following, taken in connection with the drawing which accompanies and forms part of this specification, is a description of my invention sufficient to enable those skilled in the art to practice it.

In working into the surfaces of marble, stone, slate, &c., interior moldings, sunken panels, letters, &c., the practice is to make use of the chisel at great expense of time and labor. Exterior moldings have been wrought upon the edges of such materials by the use of cutter-heads made to rotate, and set with black diamonds or carbon points or mineral carbon, such materials doing the actual work of cutting away the hard gritty matter of the stone with scarcely perceptible wear of the cutting-points or edges; but, so far as I am informed, no rotating head has ever been devised which, being set with diamonds properly secured and arranged, is able to first cut, by rotation, into a surface a countersink, and then, by rotation and lateral movement between the cutter and the material, cut a depressed channel in any desired direction and in cross-section, corresponding to the cross-sectional form of the operating part of the cutter. The cutters carrying diamonds have, so far as I know, been of one of the following kinds: First, tubular drills leaving a core, and capable of cutting in the direction of the axis of rotation only, and not of lateral progression; second, saws, both straight and circular, capable of cutting only a mere straight kerf; third, cutter-heads varying from plain cylinders capable of producing plane surfaces by rotation and relative movement between the cutters and the material, and heads capable, under such relative movement and rotation, of producing molded surfaces upon exterior edges, or of making molded kerfs in right-lined directions. Now, my invention consists in a head or stock, (made to be capable of being rotated, and with a conical or molded shaped face,) studded with mineral cutters, (preferably those known as black diamonds and by various other names,) so arranged as to give to the rotated cutter-head capacity for entrance into and progression in material, in directions at right angles to each other, said arrangement being that the diamonds are so set that jointly the paths which they traverse under rotation unitedly extend from the center or axis of rotation to parallelism with said axis; and my invention further consists in certain peculiarities in the method of setting the diamonds, which will be best understood by reference to the drawing and description thereof; and it also consists in the combination, with the cutter-head described, of a guide or gauge concentric with the axis of rotation, and located on the cutter or its spindle.

A cutter-head of my invention is shown in elevation at A, and in plan at B, while at C may be seen, in cross-section, the form of groove or of the countersink made by the special cutter illustrated. At D is seen, taken on the line $xx$, a section illustrating in one particular my peculiarity in setting the diamonds. The heads, which may be of an infinite variety of forms and sizes, are designed to be made so as to be interchangeable for others into any suitable revolving spindle. In the head $a$ is set the central carbon $b$ which makes the center $c$ of the countersink or molded groove, the carbons $d$ which form the surface $g$, and the edge carbons $i$ which form the outermost parts $l$ of the cut made in the material $m$.

It will be seen that when the cutter is made to rotate and is moved to the material, or vice versa, a countersink will be made in the material corresponding in depressed form to the shape of the path described by the combined cutting-edges of the carbons, and that if the carbons $i$ are not sunken so as to bring the whole of their cutting-edges below the surface $o$ of the material $m$, then relative lateral movement between the cutter-head and the material will result in the elongation of the countersink in any desired direction and extent.

In practice, whether I impart the relative lateral movement to the cutter or to the material, I secure to the latter a pattern, and then keep the guide $h$ on the cutter-spindle in contact with the pattern, so that the direction of the cut made is positively determined.

Each carbon-point $d\ i$ is set at an angle to the axis of the cutter-spindle, so as to first present the point of each cutter to the work instead of the whole length of edge, the cutters not only working better by being thus set, and preventing any trembling of the cutter-head, but the points being insured from breaking, as they tend to do if set parallel to the axis, or so as to cut squarely. Each carbon $d$ is also embedded in the head as seen at D, and at an angle to a radius line drawn over its cutting-point, so as to bring the carbon as near a tangential position as is consistent with its proper embedment, the cutting-strain being thereby upon the carbon in the direction of its whole depth, from point to base, (or as nearly so as is practicable,) instead of laterally upon it, thereby greatly preventing dislodgment of the carbons and lessening the liability to break off.

I claim—

1. The cutter-head with its diamond or carbon points set at low angles relatively to the cutting-path, and with edges out of radial lines, substantially as shown and described.

2. Also, in combination with the carbon pointed or studded cutter-head, the guide-collar $h$, substantially as shown and described.

ALONZO S. GEAR.

Witnesses:
FRANCIS GOULD,
C. WARREN BROWN.